US010701676B2

United States Patent
Liu et al.

(10) Patent No.: US 10,701,676 B2
(45) Date of Patent: Jun. 30, 2020

(54) CLEAR CHANNEL ASSESSMENT METHOD, INFORMATION RECEIVING METHOD, AND APPARATUSES THEREOF

(71) Applicant: Beijing Zhigu Tech Co., Ltd., Beijing (CN)

(72) Inventors: Wentao Liu, Beijing (CN); Yong Li, Beijing (CN)

(73) Assignee: BEIJING ZHIGU TECH CO., LTD., Beijing (CN)

( * ) Notice: Subject to any disclaimer, the term of this patent is extended or adjusted under 35 U.S.C. 154(b) by 74 days.

(21) Appl. No.: 15/378,296

(22) Filed: Dec. 14, 2016

(65) Prior Publication Data

US 2017/0188342 A1     Jun. 29, 2017

(30) Foreign Application Priority Data

Dec. 23, 2015   (CN) .......................... 2015 1 0980419

(51) Int. Cl.
*H04W 74/08*   (2009.01)
*H04W 16/14*   (2009.01)
*H04W 72/04*   (2009.01)

(52) U.S. Cl.
CPC ......... *H04W 72/042* (2013.01); *H04W 16/14* (2013.01); *H04W 74/0808* (2013.01)

(58) Field of Classification Search
CPC ............. H04W 16/14; H04W 52/0209; H04W 72/042; H04W 74/02; H04W 74/0808; H04W 74/0816; H04W 76/15; H04W 72/1226; H04W 72/1257
USPC ......... 370/252, 311, 329, 336, 330; 455/454
See application file for complete search history.

(56) References Cited

U.S. PATENT DOCUMENTS

| 2009/0238163 A1 | 9/2009 | Zhang et al. |
| 2014/0341018 A1 | 11/2014 | Bhushan et al. |
| 2015/0103715 A1* | 4/2015 | Chen ............ H04W 76/15 370/311 |
| 2016/0095114 A1* | 3/2016 | Kim ............ H04W 74/0816 370/329 |
| 2017/0339719 A1* | 11/2017 | Xu ............ H04W 74/0808 |

FOREIGN PATENT DOCUMENTS

| CN | 101163076 A | 4/2008 |
| CN | 101388760 A | 3/2009 |
| CN | 103987059 A | 8/2014 |

* cited by examiner

*Primary Examiner* — Harun Chowdhury
(74) *Attorney, Agent, or Firm* — Sheppard Mullin Richter & Hampton LLP (57) ABSTRACT

Embodiments of the present application disclose a clear channel assessment (CCA) method, an information receiving method, and apparatuses thereof. The CCA method comprises: sending downlink information on a first carrier, wherein the downlink information comprises first indication information, and the first indication information is used to indicate that at least one part of at least one symbol of at least one subframe is idle; and performing CCA on at least one neighboring carrier of the first carrier in at least a time of the at least one part that is idle. According to the methods and the apparatuses in the embodiments of the present application, a part of channel resources can be reserved when downlink information is transmitted on a carrier, so as to prevent interference caused by local leakage of the carrier to CCA on a neighboring carrier, thereby preventing CCA blocking between carriers.

8 Claims, 4 Drawing Sheets

CLEAR CHANNEL ASSESSMENT METHOD, INFORMATION RECEIVING METHOD, AND APPARATUSES THEREOF

CROSS REFERENCE TO RELATED APPLICATION

The present application is based on and claims the benefit of priority to Chinese Application No. 201510980419.2, filed on Dec. 23, 2015, the entire contents of which are incorporated herein by reference.

TECHNICAL FIELD

The present application relates to the technical field of communications, and in particular, to a clear channel assessment (CCA) method, an information receiving method, and apparatuses thereof.

BACKGROUND

CCA is used to determine a busy/idle state of a channel, that is, whether the channel is already occupied by another device, and if yes, wait for a period of time before the process is performed again, or if not, the channel is used to transmit data. A conflict on a radio channel can be effectively prevented by means of CCA.

In a multi-carrier application scenario, due to a limitation of a capability of an actual device, after user equipment successfully completes CCA on a carrier and starts to transmit data, local leakage of a transmitted signal results in that a signal from the device is also received on a neighboring carrier of the carrier. When performing CCA on the neighboring carrier of the used carrier, the user equipment may mistakenly consider that the interference is from a signal that is transmitted by another user equipment on the carrier, and draws a wrong conclusion of a busy state. As a result, the device gives up access attempts on the carrier that is interfered with, leading to a waste of channel resources and producing the problem of CCA blocking between carriers.

SUMMARY

In view of this, an objective of embodiments of the present application is to provide a CCA solution to effectively solve the problem of CCA blocking.

To achieve the foregoing objective, according to a first aspect of the embodiments of the present application, a CCA method is provided, wherein the method comprises:

sending downlink information on a first carrier, wherein the downlink information comprises first indication information, and the first indication information is used to indicate that at least one part of at least one symbol of at least one subframe is idle; and performing CCA on at least one neighboring carrier of the first carrier in at least a time of the at least one part that is idle.

According to a second aspect of the embodiments of the present application, an information receiving method is provided, wherein the method comprises:

receiving downlink information that is transmitted on a first carrier; and in response to that the received downlink information comprises first indication information, determining a carrying location of downlink information in at least one subframe indicated by the first indication information, wherein the first indication information is used to indicate that at least one part of at least one symbol of the at least one subframe is idle.

According to a third aspect of the present application, a CCA apparatus is provided, wherein the apparatus comprises:

a sending module, configured to send downlink information on a first carrier, wherein the downlink information comprises first indication information, and the first indication information is used to indicate that at least one part of at least one symbol of at least one subframe is idle; and a CCA module, configured to perform CCA on at least one neighboring carrier of the first carrier in at least a time of the at least one part that is idle.

According to a fourth aspect of the present application, an information receiving apparatus is provided, wherein the apparatus comprises:

a receiving module, configured to receive downlink information that is transmitted on a first carrier; and a third determining module, configured to: in response to that the received downlink information comprises first indication information, determine a carrying location of downlink information in at least one subframe indicated by the first indication information, wherein the first indication information is used to indicate that at least one part of at least one symbol of the at least one subframe is idle.

According to a fifth aspect of the present application, a CCA apparatus is provided, wherein the apparatus comprises:

a transceiver;

a memory, configured to store an instruction; and a processor, configured to execute the instruction stored in the memory, wherein the instruction enables the processor to perform the following steps:

sending, by using the transceiver, downlink information on a first carrier, wherein the downlink information comprises first indication information, and the first indication information is used to indicate that at least one part of at least one symbol of at least one subframe is idle; and performing CCA on at least one neighboring carrier of the first carrier in at least a time of the at least one part that is idle.

According to a sixth aspect of the present application, an information receiving apparatus is provided, wherein the apparatus comprises:

a transceiver;

a memory, configured to store an instruction; and a processor, configured to execute the instruction stored in the memory, wherein the instruction enables the processor to perform the following steps:

receiving, by using the transceiver, downlink information that is transmitted on a first carrier; and in response to that the received downlink information comprises first indication information, determining a carrying location of downlink information in at least one subframe indicated by the first indication information, wherein the first indication information is used to indicate that at least one part of at least one symbol of the at least one subframe is idle.

According to the methods and the apparatuses in the embodiments of the present application, a part of channel resources can be reserved when downlink information is transmitted on a carrier, so as to prevent interference caused by local leakage of the carrier to CCA on a neighboring carrier, thereby preventing CCA blocking between carriers.

DETAILED DESCRIPTION

Specific implementing manners of the present invention are further described in detail below with reference to the accompanying drawings and embodiments. The following embodiments are used to describe the present invention but are not intended to limit the scope of the present invention.

A person skilled in the art may understand that the terms in the present application such as "first" and "second" are used only to differentiate different devices, modules, or parameters, and neither represent any particular technical meanings nor represent a necessary logic sequence thereof.

Terms "system" and "network" are usually interchangeably used. For clear description, in embodiments of the present application, a Long Term Evolution (LTE) system is used as an example to describe some aspects of technical solutions in the present application in the following descriptions, and LTE-A related technical terms are used in most of the following descriptions, but the technical solutions in the present application are not limited thereto.

Figure 1:
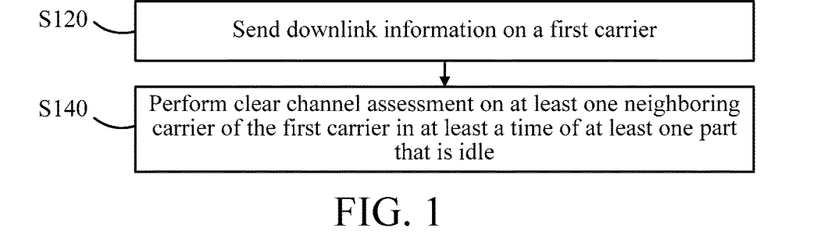
FIG. 1 is a flowchart of an example of a CCA method according to an embodiment of the present application.

FIG. 1 is a flowchart of a CCA method according to an embodiment of the present application. The method may be performed, for example, by any base station. As shown in FIG. 1, the CCA method in this embodiment comprises:

S120: Send downlink information on a first carrier, wherein the downlink information comprises first indication information, and the first indication information is used to indicate that at least one part of at least one symbol of at least one subframe is idle.

S140: Perform CCA on at least one neighboring carrier of the first carrier in at least a time of the at least one part that is idle.

In the method in this embodiment, CCA is already completed on the first carrier and an idle channel is obtained through contention, and the downlink information may be immediately sent on the first carrier after the idle channel is successfully obtained through contention, without the need of waiting for successfully obtaining through contention a channel resource on another carrier resource. In a process of transmitting the downlink information on the first carrier, to prevent CCA performed by an executing apparatus of the method in this embodiment on a neighboring carrier of the first carrier from being interfered with by signal leakage on the first carrier, in the method in this embodiment, a channel resource used by the first carrier is compressed. Specifically, at least one part of at least one symbol of a subframe corresponding to downlink information that is currently transmitted and/or at least one part of at least one symbol of any one or more (continuous or discontinuous) subframes after a downlink subframe that is currently transmitted is released, and is not used to transmit information that may interfere with a neighboring carrier, for performing CCA on one or more neighboring carriers of the first carrier in a time corresponding to the at least one part of the at least one symbol that is released. That at least one part of at least one symbol is released means that a carrier resource is idle or reserved in a time domain, and a symbol means an orthogonal frequency division multiplexing (OFDM) symbol, which corresponds to a period of time in the time domain.

To sum up, according to the method in this embodiment, a part of channel resources can be reserved when downlink information is transmitted on a carrier, so as to prevent interference caused by local leakage of the carrier to CCA on a neighboring carrier, thereby preventing CCA blocking between carriers.

In the method in this embodiment, to enable the downlink information to be correctly received and demodulated, the compression performed above to use the channel resource occupied by the first carrier needs to be indicated in the downlink information, for user equipment on the first carrier to make a reference. That is, the downlink information comprises the first indication information, and the first indication information may indicate an idle part of one or more subframes in the channel resource occupied by the first carrier. In a possible implementing manner, the one or more subframes may comprise a subframe in which the first indication information is located; in this case, in the method in this embodiment, downlink information transmitted in a subframe comprises the first indication information, to indicate that at least one part of at least one symbol of at least a current subframe is released. In another possible implementing manner, the one or more subframes may not comprise a subframe in which the first indication information is located; in this case, in the method in this embodiment, first indication information comprised in downlink information transmitted in a subframe is used to indicate that at least one part of at least one symbol of one or more subframes after a subframe corresponding to the first indication information is released.

In addition, the first indication information may be any information that can indicate an idle part in the downlink subframe. In an LTE system, in the method in this embodiment, at least one part of at least one symbol in a control region in the downlink subframe may be released, that is, at least one part of at least one symbol used for a physical downlink control channel (PDCCH) is released. In addition, the first indication information may be a reserved value of control format indicator (CFI) information carried in a physical control format indicator channel (PCFICH). In an existing LTE standard, a CFI is of 2 bits, for which four CFI codewords are defined. In a case of a standard cyclic prefix (CP), when a downlink bandwidth is greater than 10 resource blocks (RB), codewords 1 to 3 respectively indicate that numbers of OFDM symbols, used for a PDCCH, in a current subframe are 1 to 3, and correspondingly, user equipment may deduce that numbers of OFDM symbols in a data part (a data region, used for a physical downlink shared channel (PDSCH)) in the current subframe are 13 to 11; or when a downlink bandwidth is not greater than 10 RBs, codewords 1 to 3 respectively indicate that numbers of OFDM symbols, used for a PDCCH, in a current subframe are 2 to 4, and correspondingly, user equipment may deduce that numbers of OFDM symbols, used for a PDSCH, in the current subframe are 12 to 10. A codeword 4 is a reserved value. Therefore, in the method in this embodiment, the reserved value of the codeword 4 is used as the first indication information to indicate an idle part of one or more subframes. For example, in the LTE system, each downlink subframe is divided into two parts: a control region and a data region. In a possible implementing manner, when a CFI is 4, and a downlink bandwidth is greater than 10 RBs, that a number of an OFDM symbol, used for a PDCCH, in a current subframe is 2, a number of an idle symbol is 1, and a number of an OFDM symbol used for a PDSCH is 11 may be indicated; or when a CFI is 4, and a downlink bandwidth is not greater than 10 RBs, that a number of an OFDM symbol, used for a PDCCH, in a current subframe is 3, a number of an idle symbol is 1, and a number of an OFDM symbol used for a PDSCH is 10 may be indicated.

By means of the method in this embodiment, a base station may not send downlink information in a symbol of at least one subframe or a part of a symbol, to prevent interference between carriers from being generated to affect a CCA process on another carrier. In addition, in the method in this embodiment, the first indication information is used to indicate the foregoing case; therefore, user equipment will not misunderstand lengths of a control region and a data region of a current subframe, thereby not affecting the user equipment to receive the downlink information and especially data transmitted in the data region.

In a possible implementing manner, because the at least one part of the at least one symbol of the at least one subframe is idle, a channel capacity originally used for transmitting information is decreased, and the downlink information that originally should be transmitted in the at least one subframe may be not completely transmitted. For example, downlink control information that originally should be transmitted in the control region cannot be completely transmitted because a part of the control region is idle. In such an implementing manner, in the method in this embodiment, information that originally should be transmitted and that corresponds to the released part is transmitted by using another resource that is normally used. For example, a part of PDCCH information that originally needs to be transmitted is mapped to an enhanced physical downlink control channel (ePDCCH), and the ePDCCH uses a small part of PDSCH resources. In this case, the method in this embodiment further comprises:

S112: Determine control information to be transmitted in the control region of the at least one subframe.

S114: Send a part of the control information, that is, control information corresponding to the at least one part that is idle and that is indicated in the first indication information, by using a data region of the at least one subframe.

Similarly, to enable the user equipment on the first carrier to normally receive the downlink information, the downlink information may further comprise second indication information, and the second indication information is used to indicate a location of the part of the control information in the data region.

To sum up, in the method in this embodiment, blocking between CCA carriers is prevented, and the user equipment is not affected to receive the downlink information.

Generally, signal energy on a channel may be used to perform CCA, that is, when signal energy on a channel that is monitored on a target carrier is lower than a threshold, it may be considered that the channel on the target carrier is idle; otherwise, the channel is busy. In the method in this embodiment, an energy threshold for CCA may be set based on a degree of interference that may be caused by local leakage to CCA on a neighboring carrier. In this case, the method in this embodiment further comprises:

S162: Detect, before or after the at least one part of the at least one symbol that is idle and during the at least one part of the at least one symbol that is idle, an energy variation of a signal received on the at least one neighboring carrier.

S164: Determine, based on at least the variation, an energy threshold for performing CCA on the at least one neighboring carrier of the first carrier.

Specifically, due to existence of self-interference between carriers, information transmission on the first carrier causes signal energy on a neighboring carrier of the first carrier to be increased; in this case, an energy value of a received signal may be recorded. When the at least one part of the at least one symbol of the at least one subframe is released according to the method in this embodiment, due to disappearance of the self-interference between carriers, signal energy on a carrier that is previously interfered with is decreased, or signal energy on a carrier that is afterwards interfered with is increased. The energy threshold for CCA may be set based on a signal energy variation before and after interference; therefore, even though the self-interference between carriers is not completely prevented, relatively accurate CCA can still be performed based on the energy threshold, thereby preventing the problem of CCA blocking between carriers to a greatest extent.

To sum up, the method in this embodiment can solve the problem of blocking between CCA carriers that is caused by signal leakage in a multi-carrier scenario. The at least one part of the at least one symbol is released/reserved; therefore, CCA is performed, in a corresponding time, on a carrier that may be blocked, thereby preventing the problem of blocking between carriers. The idle part is indicated; therefore, the user equipment does not receive information at a corresponding location, thereby not affecting measurement and demodulation performance of the user equipment. In addition, at least one part of a symbol in the control region is preferentially reserved, to cause a data part in the downlink information to be not affected; therefore, a user data rate of a carrier on which transmission is being performed is not decreased.

Figure 2:
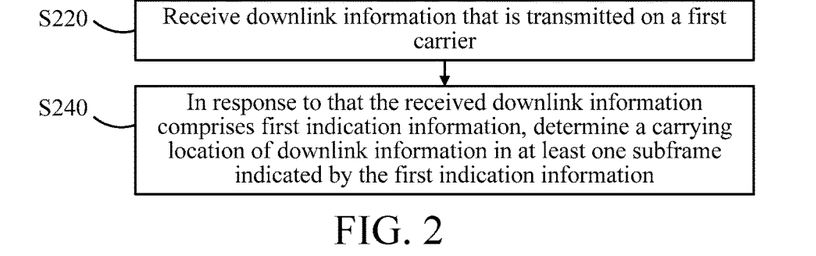
FIG. 2 is a flowchart of an example of an information receiving method according to an embodiment of the present application.

FIG. 2 is a flowchart of an example of an information receiving method according to an embodiment of the present application. The method is applicable to receiving downlink information transmitted according to the CCA method described in FIG. 1, and may be performed by any user equipment. As shown in FIG. 2, the method comprises:

S220: Receive downlink information that is transmitted on a first carrier.

S240: In response to that the received downlink information comprises first indication information, determine a carrying location of downlink information in at least one subframe indicated by the first indication information. The first indication information is used to indicate that at least one part of at least one symbol of the at least one subframe is idle.

With reference to the descriptions of FIG. 1, after successfully obtaining through contention an idle channel, a base station may immediately send the downlink information on the first carrier, without the need of waiting for successfully obtaining through contention a channel resource on another carrier resource. In addition, in a process of transmitting the downlink information on the first carrier, to prevent CCA performed on a neighboring carrier of the first carrier from being interfered with by signal leakage on the first carrier, a channel resource used by the first carrier is compressed. Specifically, at least one part of at least one symbol of a subframe corresponding to downlink information that is currently transmitted and/or at least one part of at least one symbol of any one or more (continuous or discontinuous) subframes after a downlink subframe that is currently transmitted is released, and is not used to transmit information that may interfere with a neighboring carrier, for performing CCA on one or more neighboring carriers of the first carrier in a time corresponding to the at least one part of the at least one symbol that is released. That at least one part of at least one symbol is released means that a carrier resource is idle or reserved in a time domain, and a symbol means an OFDM symbol, which corresponds to a period of time in the time domain. In addition, to enable the downlink information to be correctly received and demodulated, the compression performed above to use the channel resource occupied by the first carrier is indicated in the downlink information by using the first indication information, for user equipment on the first carrier to make a reference. The first indication information may indicate an idle part of one or more subframes in the channel resource occupied by the first carrier. In the method in this embodiment, a carrying location of downlink information in each downlink subframe is determined based on the first indication information, to correctly receive and demodulate the downlink information.

In a possible implementing manner, the first indication information may be any information that can indicate an idle part in the downlink subframe. With reference to the descriptions of FIG. 1, the base station may release at least one part of at least one symbol in a control region in the downlink subframe, that is, release at least one part of at least one symbol used for a PDCCH. In addition, the first indication information may be a reserved value of CFI information carried in a PCFICH. For example, in an LTE system, each downlink subframe is divided into two parts: a control region and a data region. In a possible implementing manner, when a CFI is 4, and a downlink bandwidth is greater than 10 RBs, that a number of an OFDM symbol, used for a PDCCH, in a current subframe is 2, a number of an idle symbol is 1, and a number of an OFDM symbol used for a PDSCH is 11 may be indicated; or when a CFI is 4, and a downlink bandwidth is not greater than 10 RBs, that a number of an OFDM symbol, used for a PDCCH, in a current subframe is 3, a number of an idle symbol is 1, and a number of an OFDM symbol used for a PDSCH is 10 may be indicated. In such an implementing manner, in step S240, a location of PDCCH information in the downlink subframe may be determined based on at least the first indication information.

In another possible implementing manner, the base station maps a part of PDCCH information that originally should be transmitted in the control region of the downlink subframe to an ePDCCH. In this case, the method in this embodiment further comprises:

S232: In response to that the received downlink information comprises second indication information, buffer information in a data region of at least one subframe indicated by the second indication information.

S234: Determine, according to at least the second indication information, control information in the data region of the at least one subframe indicated by the second indication information, so as to demodulate, according to complete control information, information corresponding to the data region.

The second indication information is used to indicate a location of the control information (that is, control information corresponding to the at least one part that is idle and that is indicated by the first indication information) in the data region.

A person skilled in the art may understand that, in the methods in the specific implementing manners of the present application, sequence numbers of the foregoing steps do not mean execution sequences. The execution sequences of the steps should be determined according to functions and internal logic of the steps, and should not be construed as any limitation to the implementation processes of the specific implementing manners of the present application.

In addition, an embodiment of the present application further provides a computer-readable medium, comprising a computer-readable instruction that performs the following operations when the computer-readable instruction is executed: performing operations of the steps of the method in the implementing manner shown in FIG. 1.

In addition, an embodiment of the present application further provides a computer-readable medium, comprising a computer-readable instruction that performs the following operations when the computer-readable instruction is executed: performing operations of the steps of the method in the implementing manner shown in FIG. 2.

Figure 3A:
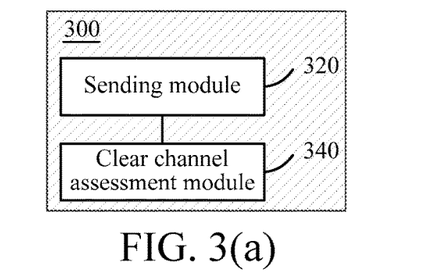
FIG. 3(a) to FIG. 3(c) are block diagrams of multiple examples of a CCA apparatus according to embodiments of the present application.

An embodiment of the present application further provides a CCA apparatus. FIG. 3(a) is a block diagram of an example of a CCA apparatus 300 according to an embodiment of the present application. The apparatus may be, for example, any base station, or belongs to any base station. As shown in FIG. 3(a), the apparatus 300 comprises:

a sending module 320, configured to send downlink information on a first carrier, wherein the downlink information comprises first indication information, and the first indication information is used to indicate that at least one part of at least one symbol of at least one subframe is idle; and a CCA module 340, configured to perform CCA on at least one neighboring carrier of the first carrier in at least a time of the at least one part that is idle.

The apparatus in this embodiment already completes CCA on the first carrier and obtains through contention an idle channel, and may immediately send the downlink information on the first carrier after successfully obtaining through contention the idle channel, without the need of waiting for successfully obtaining through contention a channel resource on another carrier resource. In a process of transmitting the downlink information on the first carrier, to prevent CCA performed by the apparatus in this embodiment on a neighboring carrier of the first carrier from being interfered with by signal leakage on the first carrier, in the apparatus in this embodiment, a channel resource used by the first carrier is compressed. Specifically, at least one part of at least one symbol of a subframe corresponding to downlink information that is currently transmitted and/or at least one part of at least one symbol of any one or more (continuous or discontinuous) subframes after a downlink subframe that is currently transmitted is released, and is not used to transmit information that may interfere with a neighboring carrier, for performing CCA on one or more neighboring carriers of the first carrier in a time corresponding to the at least one part of the at least one symbol that is released. That at least one part of at least one symbol is released means that a carrier resource is idle or reserved in a time domain, and a symbol means an OFDM symbol, which corresponds to a period of time in the time domain.

To sum up, the apparatus in this embodiment can reserve a part of channel resources when downlink information is transmitted on a carrier, so as to prevent interference caused by local leakage of the carrier to CCA on a neighboring carrier, thereby preventing CCA blocking between carriers.

In the apparatus in this embodiment, to enable the downlink information to be correctly received and demodulated, the compression performed above to use the channel resource occupied by the first carrier needs to be indicated in the downlink information, for user equipment on the first carrier to make a reference. That is, the downlink information comprises the first indication information, and the first indication information may indicate an idle part of one or more subframes in the channel resource occupied by the first carrier. In a possible implementing manner, the one or more subframes may comprise a subframe in which the first indication information is located; in this case, in the apparatus in this embodiment, downlink information transmitted in a subframe comprises the first indication information, to indicate that at least one part of at least one symbol of at least a current subframe is released. In another possible implementing manner, the one or more subframes may not comprise a subframe in which the first indication information is located; in this case, in the apparatus in this embodiment, first indication information comprised in downlink information transmitted in a subframe is used to indicate that at least one part of at least one symbol of one or more subframes after a subframe corresponding to the first indication information is released.

In addition, the first indication information may be any information that can indicate an idle part in the downlink subframe. In an LTE system, the apparatus in this embodiment may release at least one part of at least one symbol in a control region in the downlink subframe, that is, release at least one part of at least one symbol used for a PDCCH. In addition, the first indication information may be a reserved value of CFI information carried in a PCFICH. In an existing LTE standard, a CFI is of 2 bits, for which four CFI codewords are defined. In a case of a standard CP, when a downlink bandwidth is greater than 10 RBs, codewords 1 to 3 respectively indicate that numbers of OFDM symbols, used for a PDCCH, in a current subframe are 1 to 3, and correspondingly, user equipment may deduce that numbers of OFDM symbols in a data part (a data region, used for a PDSCH) in the current subframe are 13 to 11; or when a downlink bandwidth is not greater than 10 RBs, codewords 1 to 3 respectively indicate that numbers of OFDM symbols, used for a PDCCH, in a current subframe are 2 to 4, and correspondingly, user equipment may deduce that numbers of OFDM symbols, used for a PDSCH, in the current subframe are 12 to 10. A codeword 4 is a reserved value. Therefore, in the apparatus in this embodiment, the reserved value of the codeword 4 is used as the first indication information to indicate an idle part of one or more subframes. For example, in the LTE system, each downlink subframe is divided into two parts: a control region and a data region. In a possible implementing manner, when a CFI is 4, and a downlink bandwidth is greater than 10 RBs, that a number of an OFDM symbol, used for a PDCCH, in a current subframe is 2, a number of an idle symbol is 1, and a number of an OFDM symbol used for a PDSCH is 11 may be indicated; or when a CFI is 4, and a downlink bandwidth is not greater than 10 RBs, that a number of an OFDM symbol, used for a PDCCH, in a current subframe is 3, a number of an idle symbol is 1, and a number of an OFDM symbol used for a PDSCH is 10 may be indicated.

By means of the apparatus in this embodiment, a base station may not send downlink information in a symbol of at least one subframe or a part of a symbol, to prevent interference between carriers from being generated to affect a CCA process on another carrier. In addition, the apparatus in this embodiment uses the first indication information to indicate the foregoing case; therefore, user equipment will not misunderstand lengths of a control region and a data region of a current subframe, thereby not affecting the user equipment to receive the downlink information and especially data transmitted in the data region.

Figure 3B:
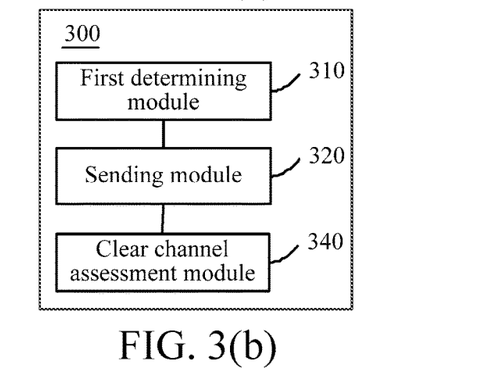

In a possible implementing manner, because the at least one part of the at least one symbol of the at least one subframe is idle, a channel capacity originally used for transmitting information is decreased, and the downlink information that originally should be transmitted in the at least one subframe may be not completely transmitted. For example, downlink control information that originally should be transmitted in the control region cannot be completely transmitted because a part of the control region is idle. In such an implementing manner, the apparatus in this embodiment transmits, by using another resource that is normally used, information that originally should be transmitted and that corresponds to the released part. For example, a part of PDCCH information that originally needs to be transmitted is mapped to an enhanced physical downlink control channel (ePDCCH), and the ePDCCH uses a small part of PDSCH resources. In this case, as shown in FIG. 3(b), the apparatus 300 in this embodiment further comprises:

a first determining module 310, configured to determine control information to be transmitted in the control region of the at least one subframe.

The sending module 320 is configured to send a part of the control information, that is, control information corresponding to the at least one part that is idle and that is indicated in the first indication information, by using a data region of the at least one subframe.

Similarly, to enable the user equipment on the first carrier to normally receive the downlink information, the downlink information may further comprise second indication information, and the second indication information is used to indicate a location of the part of the control information in the data region.

To sum up, the apparatus in this embodiment prevents blocking between CCA carriers, and does not affect the user equipment to receive the downlink information.

Figure 3C:
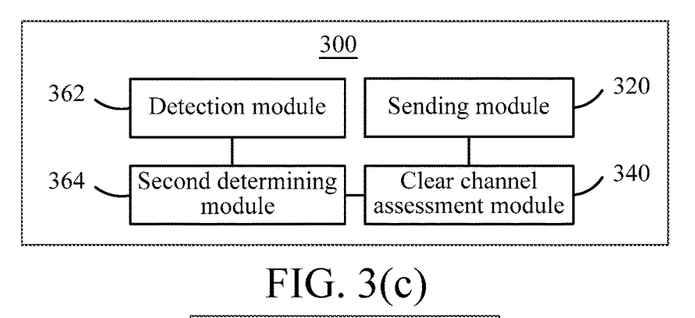

Generally, signal energy on a channel may be used to perform CCA, that is, when signal energy on a channel that is monitored on a target carrier is lower than a threshold, it may be considered that the channel on the target carrier is idle; otherwise, the channel is busy. The apparatus in this embodiment may set an energy threshold for CCA based on a degree of interference that may be caused by local leakage to CCA on a neighboring carrier. In this case, as shown in FIG. 3(c), the apparatus 300 in this embodiment further comprises:

a detection module 362, configured to detect, before or after the at least one part of the at least one symbol that is idle and during the at least one part of the at least one symbol that is idle, an energy variation of a signal received on the at least one neighboring carrier; and a second determining module 364, configured to determine, based on at least the variation, an energy threshold for performing CCA on the at least one neighboring carrier of the first carrier.

Specifically, due to existence of self-interference between carriers, information transmission on the first carrier causes signal energy on a neighboring carrier of the first carrier to be increased; in this case, an energy value of a received signal may be recorded. When the at least one part of the at least one symbol of the at least one subframe is released according to the apparatus in this embodiment, due to disappearance of the self-interference between carriers, signal energy on a carrier that is previously interfered with is decreased, or signal energy on a carrier that is afterwards interfered with is increased. The energy threshold for CCA may be set based on a signal energy variation before and after interference; therefore, even though the self-interference between carriers is not completely prevented, relatively accurate CCA can still be performed based on the energy threshold, thereby preventing the problem of CCA blocking between carriers to a greatest extent.

To sum up, the apparatus in this embodiment can solve the problem of blocking between CCA carriers that is caused by signal leakage in a multi-carrier scenario. The at least one part of the at least one symbol is released/reserved; therefore, CCA is performed, in a corresponding time, on a carrier that may be blocked, thereby preventing the problem of blocking between carriers. The idle part is indicated; therefore, the user equipment does not receive information at a corresponding location, thereby not affecting measurement and demodulation performance of the user equipment. In addition, at least one part of a symbol in the control region is preferentially reserved, to cause a data part in the downlink information to be not affected; therefore, a user data rate of a carrier on which transmission is being performed is not decreased.

Figure 4:
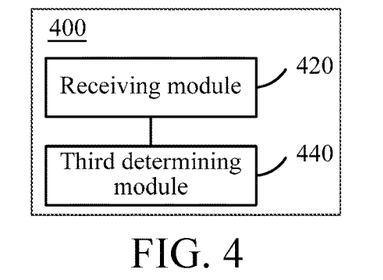
FIG. 4 is a block diagram of an example of an information receiving apparatus according to an embodiment of the present application.

FIG. 4 is a flowchart of an example of an information receiving apparatus according to an embodiment of the present application. The apparatus is applicable to receiving downlink information transmitted according to the CCA method described in FIG. 1, and may be or may belong to any user equipment. As shown in FIG. 4, the apparatus 400 comprises:

a receiving module 420, configured to receive downlink information that is transmitted on a first carrier; and a third determining module 440, configured to: in response to that the received downlink information comprises first indication information, determine a carrying location of downlink information in at least one subframe indicated by the first indication information. The first indication information is used to indicate that at least one part of at least one symbol of the at least one subframe is idle.

With reference to the descriptions of FIG. 1, after successfully obtaining through contention an idle channel, a base station may immediately send the downlink information on the first carrier, without the need of waiting for successfully obtaining through contention a channel resource on another carrier resource. In addition, in a process of transmitting the downlink information on the first carrier, to prevent CCA performed on a neighboring carrier of the first carrier from being interfered with by signal leakage on the first carrier, a channel resource used by the first carrier is compressed. Specifically, at least one part of at least one symbol of a subframe corresponding to downlink information that is currently transmitted and/or at least one part of at least one symbol of any one or more (continuous or discontinuous) subframes after a downlink subframe that is currently transmitted is released, and is not used to transmit information that may interfere with a neighboring carrier, for performing CCA on one or more neighboring carriers of the first carrier in a time corresponding to the at least one part of the at least one symbol that is released. That at least one part of at least one symbol is released means that a carrier resource is idle or reserved in a time domain, and a symbol means an OFDM symbol, which corresponds to a period of time in the time domain. In addition, to enable the downlink information to be correctly received and demodulated, the compression performed above to use the channel resource occupied by the first carrier is indicated in the downlink information by using the first indication information, for user equipment on the first carrier to make a reference. The first indication information may indicate an idle part of one or more subframes in the channel resource occupied by the first carrier. The apparatus in this embodiment determines a carrying location of downlink information in each downlink subframe based on the first indication information, to correctly receive and demodulate the downlink information.

In a possible implementing manner, the first indication information may be any information that can indicate an idle part in the downlink subframe. With reference to the descriptions of FIG. 3(a), the base station may release at least one part of at least one symbol in a control region in the downlink subframe, that is, release at least one part of at least one symbol used for a PDCCH. In addition, the first indication information may be a reserved value of CFI information carried in a PCFICH. For example, in an LTE system, each downlink subframe is divided into two parts: a control region and a data region. In a possible implementing manner, when a CFI is 4, and a downlink bandwidth is greater than 10 RBs, that a number of an OFDM symbol, used for a PDCCH, in a current subframe is 2, a number of an idle symbol is 1, and a number of an OFDM symbol used for a PDSCH is 11 may be indicated; or when a CFI is 4, and a downlink bandwidth is not greater than 10 RBs, that a number of an OFDM symbol, used for a PDCCH, in a current subframe is 3, a number of an idle symbol is 1, and a number of an OFDM symbol used for a PDSCH is 10 may be indicated. In such an implementing manner, the third determining module 440 may determine a location of PDCCH information in the downlink subframe based on at least the first indication information.

In another possible implementing manner, the base station maps a part of PDCCH information that originally should be transmitted in the control region of the downlink subframe to an ePDCCH. In this case, the receiving module 420 is further configured to: in response to that the received downlink information comprises second indication information, buffer information in a data region of at least one subframe indicated by the second indication information.

The third determining module 440 is further configured to determine, according to at least the second indication information, control information in the data region of the at least one subframe indicated by the second indication information, so as to demodulate, according to complete control information, information corresponding to the data region.

The second indication information is used to indicate a location of the control information (that is, control information corresponding to the at least one part that is idle and that is indicated by the first indication information) in the data region.

The technical solutions of the embodiments of the present application are further described below with reference to a multi-carrier licensed assisted access (LAA) scenario. An LAA technology is a typical solution to expand a capacity of a mobile communications system by using an unlicensed spectrum. A licensed spectrum is a radio spectrum that an operator is granted to use according to regulations of nations, and is allowed to be used only with a license and authorization after network access test is passed. An unlicensed spectrum can be used without authorization of a government, such as a working frequency band of a WiFi or Bluetooth device, or the like. In an LAA system, a base station may use an unlicensed spectrum to improve a user throughput and a system capacity. However, because multiple systems share an unlicensed spectrum, to enable each system to have an opportunity to fairly access the unlicensed spectrum, a conventional contention mechanism is generally used to determine use of the unlicensed spectrum. In the LAA system, because an LAA node needs to coexist with an 802.11 node that shares the unlicensed spectrum and another LAA system, before data is sent, a busy/idle state of a channel needs to be detected, that is, a CCA process is performed. Because multiple available unlicensed carriers exist in the unlicensed spectrum, for an LAA base station with a multi-carrier capability, before downlink transmission is performed, CCA needs to be performed on each carrier, thereby ensuring that fair access of a spectrum can be implemented on each carrier.

Figure 5A:
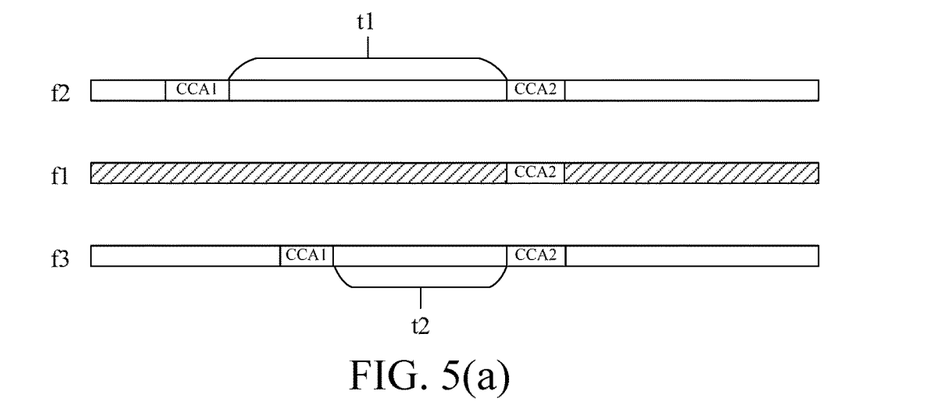
FIG. 5(a) is a schematic diagram of CCA in a conventional multi-carrier LAA scenario in which blocking between CCA carriers exists.

As shown in FIG. 5(a), a base station transmits downlink information on a carrier f1, which is shown by shadows in the figure, and to perform multi-carrier transmission, the base station needs to perform CCA on neighboring carriers f2 and f3 of the carrier f1 and contends for an idle channel. When information is transmitted on the carrier f1, CCA1 that is separately performed on the neighboring carriers f2 and f3 of the carrier f1 fails due to leakage of a signal transmitted on the f1. Therefore, it is best to wait unit transmission performed on the f1 ends and then perform CCA2 on the f2 and the f3. However, in periods of time t1 and t2 of waiting, channels of the carriers f2 and f3 may be both occupied by another system, and a transmission delay is increased.

Figure 5B:
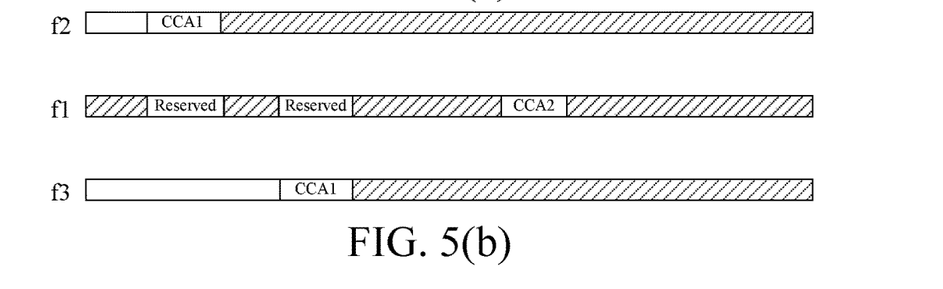
FIG. 5(b) is a schematic diagram of performing CCA in a multi-carrier LAA scenario according to a technical solution of an embodiment of the present application.
Figure 5C:
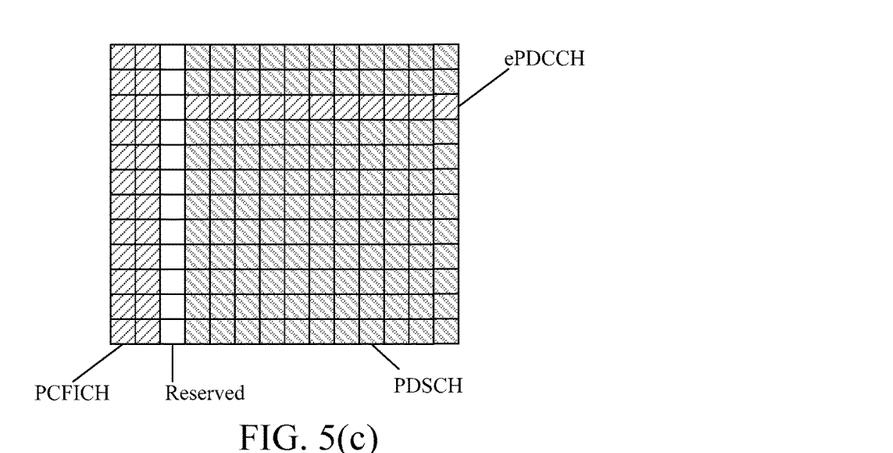
FIG. 5(c) is a schematic structural diagram of an example of a downlink subframe according to a technical solution of an embodiment of the present application.

According to the method in this embodiment, when CCA needs to be performed on the f2 and the f3, as shown in FIG. 5(b), the base station actively reserves the third OFDM symbol of a next subframe of the f1, and places a part of control information in an ePDCCH in a data region for transmission, and as shown in FIG. 5(c), notifies user equipment on the carrier f1 of the reservation by using a PCFICH.

Figure 6:
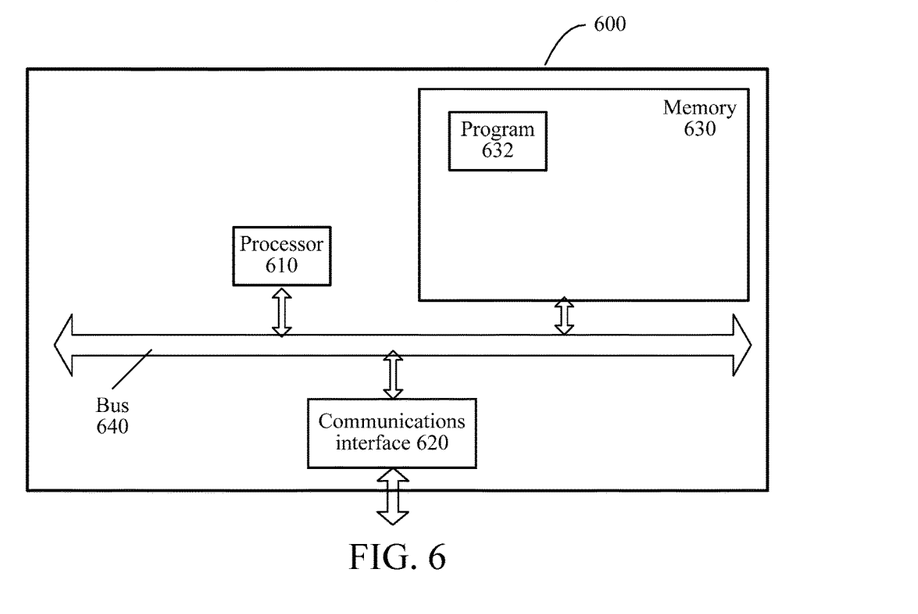
FIG. 6 is a structural block diagram of another example of a CCA apparatus according to an embodiment of the present application.

FIG. 6 is a schematic structural diagram of another example of a CCA apparatus according to an embodiment of the present application. A specific embodiment of the present application does not limit specific implementation of the CCA apparatus. As shown in FIG. 6, the CCA apparatus 600 may comprise:

a processor 610, a communications interface 620, a memory 630, and a communications bus 640.

The processor 610, the communications interface 620, and the memory 630 complete mutual communication by using the communications bus 640.

The communications interface 620 is configured to communicate with a network element such as a client.

The processor 610 is configured to perform a program 632, and may specifically perform related steps in the foregoing method embodiment in FIG. 1.

Specifically, the program 632 may comprise program code, wherein the program code comprises a computer operation instruction.

The processor 610 may be a central processing unit (CPU) or an application specific integrated circuit (ASIC), or one or more integrated circuits configured to implement the embodiments of the present application.

The memory 630 is configured to store the program 632. The memory 630 may comprise a high-speed random access memory (RAM), and may further comprise a non-volatile memory, for example, at least one magnetic disk storage. The program 632 may be specifically configured to enable the CCA apparatus 600 to perform the following steps:

sending downlink information on a first carrier, wherein the downlink information comprises first indication information, and the first indication information is used to indicate that at least one part of at least one symbol of at least one subframe is idle; and performing CCA on at least one neighboring carrier of the first carrier in at least a time of the at least one part that is idle.

For specific implementation of the steps in the program 632, reference may be made to corresponding descriptions of corresponding steps and units in the foregoing embodiments, and details are not described herein again. A person skilled in the art may clearly understand that, for the purpose of convenient and brief description, for specific working processes of the units and modules described above, reference may be made to corresponding processes in the method embodiments, and details are not described herein again.

Figure 7:
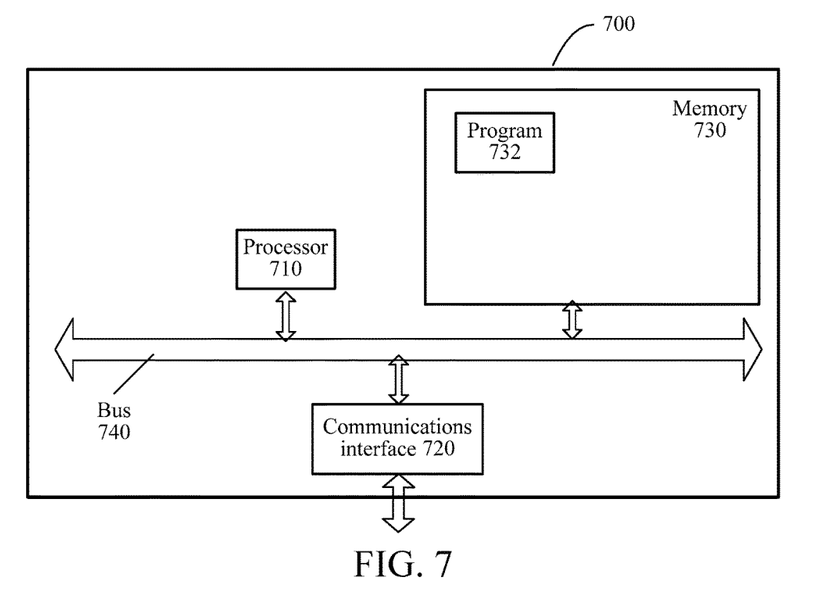
FIG. 7 is a structural block diagram of another example of an information receiving apparatus according to an embodiment of the present application.

FIG. 7 is a schematic structural diagram of another example of an information receiving apparatus according to an embodiment of the present application. A specific embodiment of the present application does not limit specific implementation of the information receiving apparatus. As shown in FIG. 7, the information receiving apparatus 700 may comprise:

a processor 710, a communications interface 720, a memory 730, and a communications bus 740.

The processor 710, the communications interface 720, and the memory 730 complete mutual communication by using the communications bus 740.

The communications interface 720 is configured to communicate with a network element such as a client.

The processor 710 is configured to perform a program 732, and may specifically perform related steps in the foregoing method embodiment in FIG. 2.

Specifically, the program 732 may comprise program code, wherein the program code comprises a computer operation instruction.

The processor 710 may be a CPU or an ASIC, or one or more integrated circuits configured to implement the embodiments of the present application.

The memory 730 is configured to store the program 732. The memory 730 may comprise a high-speed RAM, and may further comprise a non-volatile memory, for example, at least one magnetic disk storage. The program 732 may be specifically configured to enable the information receiving apparatus 700 to perform the following steps:

receiving downlink information that is transmitted on a first carrier; and in response to that the received downlink information comprises first indication information, determining a carrying location of downlink information in at least one subframe indicated by the first indication information, wherein the first indication information is used to indicate that at least one part of at least one symbol of the at least one subframe is idle.

For specific implementation of the steps in the program 732, reference may be made to corresponding descriptions of corresponding steps and units in the foregoing embodiments, and details are not described herein again. A person skilled in the art may clearly understand that, for the purpose of convenient and brief description, for specific working processes of the units and modules described above, reference may be made to corresponding processes in the method embodiments, and details are not described herein again.

A person skilled in the art may clearly understand that, for the purpose of convenient and brief description, for specific working processes of the devices and modules described above, reference may be made to corresponding descriptions in the apparatus embodiments, and details are not described herein again.

Although the subject matter described herein is combined operating system and application programs executed on a computing system and implementation of the general context provided, a person skilled in the art may be aware that other types of program modules can be combined to perform other implementations. Generally, program modules comprise routines, programs, components, data structures, and other types of structures that perform particular tasks or implement particular abstract data types. A person skilled in the art may understand that the subject matter described herein may be practiced by using other computer system configurations, comprising hand-held devices, multiprocessor systems, microprocessor-based or programmable consumer electronics, minicomputers, mainframe computers, and the like, or may use a distributed computing environment in which tasks are performed by remote processing devices connected by using a communications network. In the distributing computing environment, the program modules may be located in both local and remote memory storage devices.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in the form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and comprises several instructions for instructing a computer device (which may be a personal computer, a server, a network device, or the like) to perform all or a part of the steps of the methods described in the embodiments of the present application. The computer-readable storage medium may comprise volatile and non-volatile, and removable and non-removable mediums that are implemented by any manner or technology used to store information such as computer-readable instructions, data structures, program modules, or other data. The computer-readable storage medium specifically comprises, but is not limited to, a USB drive, a removable hard disk, a read-only memory (ROM), a RAM, an erasable programmable ROM (EPROM), an electrically erasable programmable ROM (EEPROM), a flash memory, or another solid state memory technology, a CD-ROM, a digital versatile disc (DVD), an HD-DVD, Blue-Ray, or another optical storage device, a magnetic tape, a magnetic disk storage or other magnetic storage devices, or any other medium that can be used to store required information and that can be accessed by a computer.

The foregoing implementing manners are merely intended for describing the present invention rather than limiting the present invention, and a person of ordinary skill in related technical field can further make various changes and variations without departing from the spirit and scope of the present invention. Therefore, all equivalent technical solutions should also fall within the scope of the present invention, and the patent protection scope of the present invention shall be subject to the claims.

What is claimed is:

1. A clear channel assessment (CCA) method, comprising:
sending downlink information on a first carrier, wherein the downlink information comprises first indication information, the first indication information is used to indicate that at least one part of at least one symbol in a control region of at least one subframe is idle, the at least one subframe is in a channel resource occupied by the first carrier and includes a first subframe and one or more second subframe after the first subframe, and the downlink information is transmitted in the first subframe;

performing CCA on at least one neighboring carrier of the first carrier in at least a time of the at least one part that is idle;

determining control information to be transmitted in the control region of the at least one subframe in the channel resource occupied by the first carrier; and sending a part of the control information by using a data region of the at least one subframe in the channel resource occupied by the first carrier, wherein the part of the control information corresponds to the at least one part that is idle and that is indicated in the first indication information, wherein the downlink information comprises second indication information, and the second indication information is used to indicate a location of the part of the control information in the data region.

2. The method of claim 1, wherein the first indication information is a reserved value of control format indicator (CFI) information.

3. The method of claim 1, further comprising:
detecting, before or after the at least one part of the at least one symbol that is idle and during the at least one part of the at least one symbol that is idle, an energy variation of a signal received on the at least one neighboring carrier; and
determining, based on at least the variation, an energy threshold for performing CCA on the at least one neighboring carrier of the first carrier.

4. An information receiving method, comprising:
receiving downlink information that is transmitted on a first carrier;
in response to that the received downlink information comprises first indication information, determining a carrying location of downlink information in at least one subframe indicated by the first indication information, wherein the first indication information is used to indicate that at least one part of at least one symbol in a control region of the at least one subframe is idle, the at least one subframe is in a channel resource occupied by the first carrier and includes a first subframe and one or more second subframe after the first subframe, and the downlink information is transmitted in the first subframe;
in response to that the received downlink information comprises second indication information, buffering information in a data region of the at least one subframe, in the channel resource occupied by the first carrier, indicated by the second indication information; and
determining, according to at least the second indication information, control information in the data region of the at least one subframe, in the channel resource occupied by the first carrier, indicated by the second indication information, wherein the control information corresponds to the at least one part that is idle and that is indicated in the first indication information,
wherein the second indication information is used to indicate a location of the control information in the data region.

5. The method of claim 4, wherein the first indication information is a reserved value of control format indicator (CFI) information.

6. A clear channel assessment (CCA) apparatus, comprising:
a transceiver;
a memory configured to store an instruction; and
a processor configured to execute the instruction stored in the memory, wherein the instruction enables the processor to perform operations including:
sending, by the transceiver, downlink information on a first carrier, wherein the downlink information comprises first indication information, the first indication information is used to indicate that at least one part of at least one symbol in a control region of at least one subframe is idle, the at least one subframe is in a channel resource occupied by the first carrier and includes a first subframe and one or more second subframe after the first subframe, and the downlink information is transmitted in the first subframe;
performing CCA on at least one neighboring carrier of the first carrier in at least a time of the at least one part that is idle;

determining control information to be transmitted in the control region of the at least one subframe in the channel resource occupied by the first carrier; and
sending a part of the control information by using a data region of the at least one subframe in the channel resource occupied by the first carrier, wherein the part of the control information corresponds to the at least one part that is idle and that is indicated in the first indication information,
wherein the downlink information comprises second indication information, and the second indication information is used to indicate a location of the part of the control information in the data region.

7. The apparatus of claim 6, wherein the operations further include:
detecting, before or after the at least one part of the at least one symbol that is idle and during the at least one part of the at least one symbol that is idle, an energy variation of a signal received on the at least one neighboring carrier; and
determining, based on at least the variation, an energy threshold for performing CCA on the at least one neighboring carrier of the first carrier.

8. An information receiving apparatus, comprising:
a transceiver;
a memory configured to store an instruction; and
a processor configured to execute the instruction stored in the memory, wherein the instruction enables the processor to perform operations including:
receiving, by the transceiver, downlink information that is transmitted on a first carrier;
in response to that the received downlink information comprises first indication information, determining a carrying location of downlink information in at least one subframe indicated by the first indication information, wherein the first indication information is used to indicate that at least one part of at least one symbol in a control region of the at least one subframe is idle, the at least one subframe is in a channel resource occupied by the first carrier and includes a first subframe and one or more second subframe after the first subframe, and the downlink information is transmitted in the first subframe;
in response to that the received downlink information comprises second indication information, buffering information in a data region of the at least one subframe, in the channel resource occupied by the first carrier, indicated by the second indication information; and
determining, according to at least the second indication information, control information in the data region of the at least one subframe, in the channel resource occupied by the first carrier, indicated by the second indication information, wherein the control information corresponds to the at least one part that is idle and that is indicated in the first indication information,
wherein the second indication information is used to indicate a location of the control information in the data region.

* * * * *